United States Patent
Hahl et al.

(10) Patent No.: US 10,054,709 B2
(45) Date of Patent: Aug. 21, 2018

(54) OBJECT LOCATER AND METHOD FOR LOCATING A METALLIC AND/OR MAGNETIZABLE OBJECT

(71) Applicant: Robert Bosch GmbH, Stuttgart (DE)

(72) Inventors: Markus Hahl, Korntal-Muenchingen (DE); Juergen Winterhalter, Stuttgart (DE); Andrej Albrecht, Leinfelden-Echterdingen (DE); Tobias Zibold, Stuttgart (DE); Oliver Grossmann, Kelkheim (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 14/782,152

(22) PCT Filed: Feb. 14, 2014

(86) PCT No.: PCT/EP2014/052938
§ 371 (c)(1),
(2) Date: Oct. 2, 2015

(87) PCT Pub. No.: WO2014/161689
PCT Pub. Date: Oct. 9, 2014

(65) Prior Publication Data
US 2016/0041290 A1 Feb. 11, 2016

(30) Foreign Application Priority Data
Apr. 4, 2013 (DE) .................. 10 2013 205 910

(51) Int. Cl.
*G01V 3/08* (2006.01)
*G01V 3/10* (2006.01)

(52) U.S. Cl.
CPC .................... *G01V 3/104* (2013.01)

(58) Field of Classification Search
CPC .................. G01R 31/2884; G01R 31/282
(Continued)

(56) References Cited

U.S. PATENT DOCUMENTS

| 2,557,994 A | 6/1951 | Ostlund |
| 7,082,067 B2 * | 7/2006 | Venkatraman ......... G11C 29/50 365/154 |

(Continued)

FOREIGN PATENT DOCUMENTS

| CH | 532 254 A | 12/1972 |
| CN | 86 1 03324 A | 12/1986 |

(Continued)

OTHER PUBLICATIONS

International Search Report corresponding to PCT Application No. PCT/EP2014/052938, dated Jun. 8, 2014 (German and English language document) (5 pages).

*Primary Examiner* — Giovanni Astacio-Oquendo
(74) *Attorney, Agent, or Firm* — Maginot, Moore & Beck LLP

(57) ABSTRACT

A sensor for locating metallic or magnetizable objects comprises two emission coils and a receiving coil which are inductively interconnected. A method for determining the influence of temperature on the sensor includes supplying a first pair of predetermined alternating currents to the emitter coils, and simultaneously sampling current flows which pass through the emitter coils and a first current of the receiver coil. Subsequently, the method includes supplying a second pair of predetermined alternating currents to the emitter coils, and simultaneously sampling current flows which pass through the emitter coils and a second current of the receiver coil. The method further includes determining coupling factors between the emitter coils and the receiver coils based on the determined current flows and voltages, and determining the object based on the coupling factors.

14 Claims, 3 Drawing Sheets

(58) Field of Classification Search
USPC .............................. 324/750.3, 327, 331, 537
See application file for complete search history.

(56) References Cited

U.S. PATENT DOCUMENTS

| | | | |
|---|---|---|---|
| 7,205,854 B2* | 4/2007 | Liu | G01R 31/31727 |
| | | | 324/750.3 |
| 8,095,104 B2* | 1/2012 | Kawae | G06F 1/04 |
| | | | 331/186 |
| 2007/0222437 A1 | 9/2007 | Haase | |
| 2008/0068099 A1* | 3/2008 | Bhushan | H03K 3/0315 |
| | | | 331/57 |
| 2009/0251223 A1* | 10/2009 | Nassif | G01R 31/275 |
| | | | 331/44 |
| 2010/0253416 A1* | 10/2010 | Ishii | H01L 23/34 |
| | | | 327/513 |
| 2012/0049850 A1 | 3/2012 | Reime | |

FOREIGN PATENT DOCUMENTS

| | | |
|---|---|---|
| CN | 101031822 A | 9/2007 |
| CN | 101217303 A | 7/2008 |
| CN | 102428390 A | 4/2012 |
| CN | 102998711 A | 3/2013 |
| DE | 10 2004 047 188 A1 | 3/2006 |
| DE | 10 2004 047 189 A1 | 6/2006 |
| DE | 10 2010 031 142 A1 | 11/2011 |
| JP | 55-66774 A | 5/1980 |
| JP | 59-116569 A | 7/1984 |
| JP | 2007-22712 A | 2/2007 |
| JP | 2012-527603 A | 11/2012 |
| JP | 2013-27171 A | 2/2013 |
| WO | 2006/084675 A1 | 8/2006 |
| WO | 2010/133328 A1 | 11/2010 |

* cited by examiner

OBJECT LOCATER AND METHOD FOR LOCATING A METALLIC AND/OR MAGNETIZABLE OBJECT

This application is a 35 U.S.C. § 371 National Stage Application of PCT/EP2014/052938, filed on Feb. 14, 2014, which claims the benefit of priority to Serial No. DE 10 2013 205 910.8, filed on Apr. 4, 2013 in Germany, the disclosures of which are incorporated herein by reference in their entirety.

The present disclosure relates to an object locator, also referred to as a locating device. In particular, the present disclosure relates to a temperature-compensated object locator and a method for the temperature compensation of an object locator.

BACKGROUND

An object locator for locating a metallic or magnetizable object generates an electromagnetic field by means of a transmitting coil and checks by means of a receiving coil whether the electromagnetic field was changed by the object. WO 2010/133328 A1 shows a metal detector having two transmitting coils and one receiving coil. The transmitting coils are supplied with phase-shifted alternating currents, and an output signal of a receiving coil which is inductively coupled to the transmitting coils is evaluated. Currents or voltages of the transmitting coils are changed as a function of the received signal in such a way that the received signal is extinguished. The presence of a metallic object in the area of the transmitting and receiving coils may then be inferred from the ratio of the voltages or currents of the transmitting coils.

However, a change in a current flowing through the transmitting or receiving coil of an object locator may also be due to a temperature influence. For example, a current or voltage source for the transmitting coil or a measuring amplifier for the receiving coil may be subject to a temperature drift. Geometric ratios of the coils used may also be changed by a change in temperature.

The drift may be so large that the object can no longer be located with absolute certainty, or is located in a place other than the determined place.

The object of the present disclosure is therefore to provide a method for determining a temperature influence on a sensor for locating metallic or magnetic objects, a corresponding computer program product, and a corresponding sensor. Furthermore, the object of the present disclosure is to provide a measuring device, in particular an object locator, also referred to as a locating device.

The present disclosure achieves these objects by means of the subject matter of the independent claims. Subclaims describe preferred specific embodiments.

SUMMARY

A sensor for locating metallic and/or magnetic objects comprises at least two transmitting coils and one receiving coil which are inductively coupled to each other. In one method according to the present disclosure for determining a temperature influence on the sensor, a first pair of predetermined AC voltages is provided at the transmitting coils, and currents flowing through the transmitting coils and a first voltage of the receiving coil are sampled, in particular they are sampled simultaneously, in particular during the application of the first pair of predetermined AC voltages.

Subsequently, a second pair of predetermined AC voltages is provided at the transmitting coils, and the currents flowing through the transmitting coils and a second voltage of the receiving coil are sampled, in particular these currents and the voltage are sampled simultaneously, i.e., in particular during the application of the second pair of predetermined AC voltages. Based on the determined currents and voltages, coupling factors between the transmitting coils and the receiving coil are then determined, and the object is determined based on the coupling factors. A determination of the object is in particular understood to mean the identification of the location or position of the object and possibly also the identification of the type of object.

The method is based on the idea that both the voltages of the receiving coil and the coupling factors change under the influence of an object in the area of the transmitting coils and the receiving coil.

If there is a temperature influence which changes the voltages of the receiving coil, the coupling factors remain unchanged. By comparing the determined voltages and the determined coupling factors with reference values which, for example, are determined or fixedly predefined once, the temperature influence may be determined in a simple and reliable manner. Thus, for example, it is possible to determine or compensate for a temperature drift of a voltage or current source for the transmitting coils, or of a measuring amplifier for the receiving coil. The method may thus allow a temperature-compensated object determination.

The object may in particular be determined, i.e., identified as or considered to be an object, if the coupling factors differ with respect to the coupling factors of a previous measurement. It is thus possible to distinguish reliably between an influence of the object and a temperature influence on the received signals.

In one preferred specific embodiment, the previously determined voltages and coupling factors relate to an arrangement in which the inductive coupling between the transmitting coils and the receiving coil is uninfluenced by metallic or magnetizable objects. It is thus possible to ensure that no reference object having predetermined magnetic properties must be used for determining the temperature influence.

In one specific embodiment, the voltages of the first pair of AC voltages are phase-shifted with respect to each other by less than ±5°, and the voltages of the second pair of AC voltages are also phase-shifted by less than ±5° with respect to each other.

In one particularly preferred specific embodiment, constants A, B, C1, and C2 are chosen, wherein during the first pair of AC voltages, the voltage of the first transmitting coil is A and the voltage of the transmitting coil is B+C1. During the second pair of AC voltages, the voltage of the first transmitting coil is A+C2, and the voltage of the second transmitting coil is B. The summand C1 is approximately 3% to 7% of A, and the summand C2 is approximately 3% to 7% of B. Furthermore, A/B preferably corresponds to the ratio of the coupling factor of the second transmitting coil to that of the first transmitting coil.

This choice of voltages and ratio makes it possible to prevent the voltage of the receiving coil from assuming the value zero during both the first and the second pair of AC voltages. The mathematical and process-related treatment of the above-described voltages and currents may thereby be carried out in a simplified manner. As a result, dealing with a special case or discarding an erroneous measurement may be unnecessary.

In yet another specific embodiment, the coupling factors are determined and offset against each other a first time, in particular scaled and deducted from each other in pairs, and after reconfiguration of the measuring arrangement, in particular after reversing the polarity of the receiving coil, are determined and offset against each other a second time. It is thus possible to further diminish the temperature influence on a measurement result, on which the determination of the object is based, in a simple manner.

One computer program product according to the present disclosure includes program code means for carrying out the described method if the computer program product runs on a processing device or is stored on a computer-readable data carrier.

A sensor according to the present disclosure for locating a metallic or magnetizable object comprises at least two transmitting coils and one receiving coil which are inductively coupled to each other, a control device for supplying the transmitting coils with AC voltages, and a sampling device for determining currents flowing through the transmitting coils and for determining the received signal, while voltages at the transmitting coils assume first and second predetermined value pairs. In this regard, the processing device is configured to determine coupling factors between the transmitting coils and the receiving coil based on the determined currents and voltages, and to determine the object based on the coupling factors.

Such a sensor may take into consideration the determined temperature influence during normal operation for detecting an object, in order to compensate for resulting measurement errors which occur. As a result, a temperature-compensated determination of the object may be made possible.

It is thus advantageously possible to achieve a measuring device, in particular a locating device for detecting objects enclosed in a medium, which is compact, has high performance, and requires no calibration, i.e., no longer has to be calibrated by a user before each individual measurement.

In one specific embodiment, parts of the sensor are implemented by means of a programmable microcomputer. The sampling device may comprise an analog-digital converter, and selection means may be provided in order to alternatively sample the received signal or one of the coil currents by means of the sampling device. To determine the coil currents, a measuring resistor may be connected in series with each transmitting coil, the voltage dropping across the measuring resistor indicating the current flowing through the transmitting coil. The analog-digital converter may be comprised by the programmable microcomputer, and the selection means may be implemented in a simple manner in order to measure the aforementioned currents or voltages. As a result, circuit complexity of the (possibly internal) peripherals of the programmable microcomputer may be kept low. Accordingly, manufacturing costs of the sensor may be reduced.

In a similar way, the control device may comprise a digital-analog converter for controlling at least one of the transmitting coils. Two digital-analog converters may also be provided, one being fixedly assigned to each of the transmitting coils.

Optionally, a first reference voltage source may be provided for supplying the receiving coil with a predetermined voltage. The received signal, which is determinable by means of the receiving coil, may thus be related to the voltage of the first reference voltage source. A second reference voltage source may be provided for supplying each of the transmitting coils with a predetermined voltage. In an additional specific embodiment, the voltage of the first reference voltage source or the voltage of the second reference voltage source may be connected to the analog-digital converter by means of the aforementioned selection means, in order to determine absolute values of the reference voltages. As a result, it may be prevented that a temperature drift of the reference voltage sources is undetected.

BRIEF DESCRIPTION OF THE DRAWINGS

The present disclosure will now be described in greater detail with reference to the attached figures.

DETAILED DESCRIPTION

Figure 1:
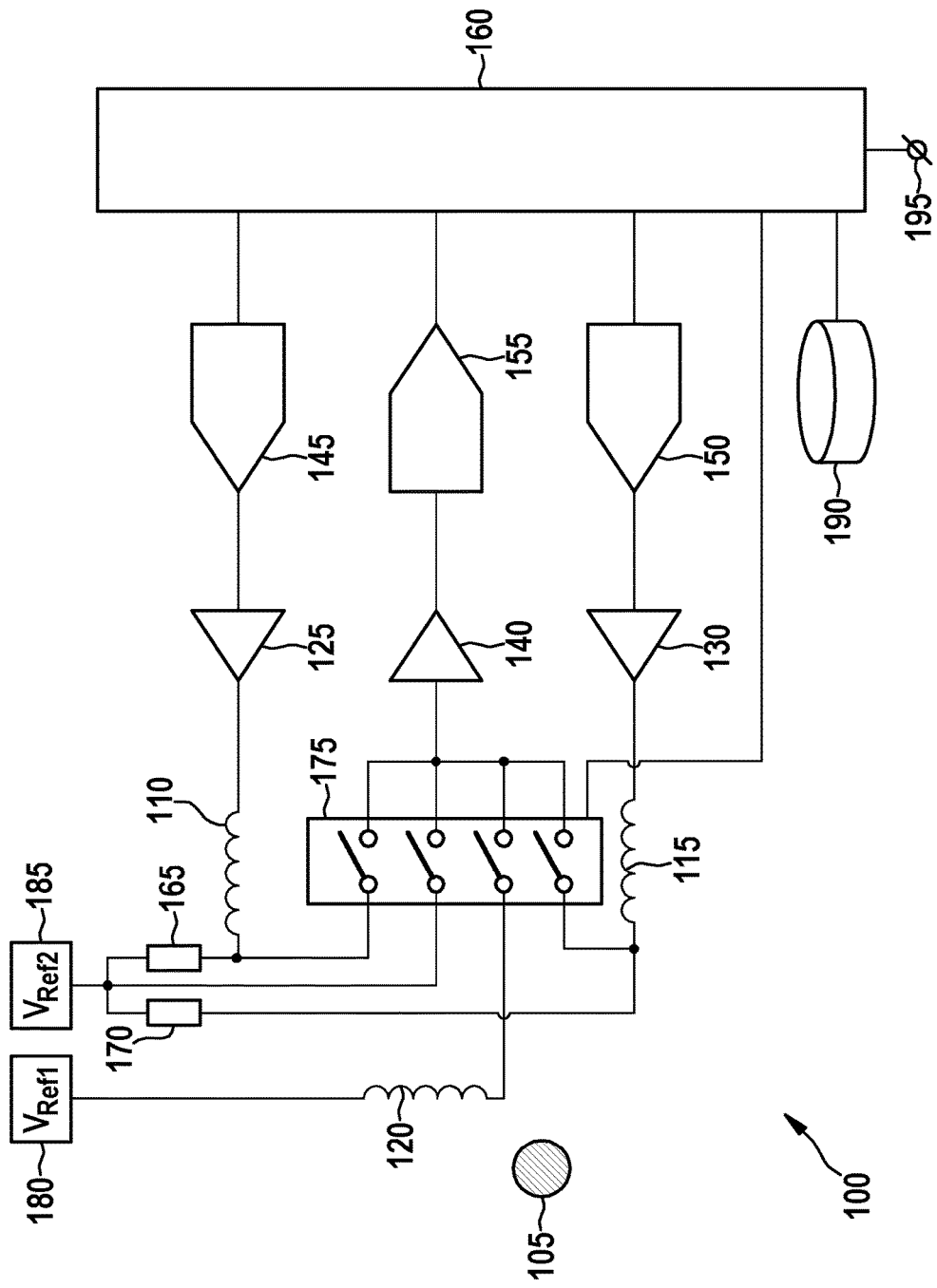
FIG. 1 shows a circuit diagram of a sensor for detecting metallic or magnetizable objects.

FIG. 1 shows a circuit diagram of a sensor 100 for detecting metallic or magnetizable objects 105. The sensor 100 comprises a first transmitting coil 110, a second transmitting coil 115, and a receiving coil 120 which are inductively coupled to each other, a preferred structure of the coils 110, 115, and 120 being explained in greater detail with reference to FIG. 2. The transmitting coils 110 and 115 are supplied with AC voltages, so that they generate electromagnetic fields which act on the receiving coil 120. The receiving coil 120 converts the electromagnetic field, which is possibly influenced by the object 105, into a voltage which is available as a received signal. Based on the received signal, it is possible to infer the presence or absence of the object 105 taking into consideration the geometric arrangement of the coils 110, 115, and 120.

For amplification or impedance conversion, a first transmitting amplifier 125 is assigned to the first transmitting coil 110, a second transmitting amplifier 130 is assigned to the second transmitting coil 115, and a receiving amplifier 135 is assigned to the receiving coil 120. In the circuit diagram of FIG. 1, a portion of the sensor 100 is preferably designed using digital technology. The digital elements may in particular be comprised by an integrated, programmable microcomputer.

Alternatively, some or all of the elements may be structured discretely or in an analog manner. The first transmitting amplifier 125 is controlled by a first analog-digital converter 145, and the second transmitting amplifier 130 is controlled by a second analog-digital converter 150. The received signal of the receiving amplifier 135 is provided to a digital-analog converter 155. A processing device 160 is configured to control the analog-digital converters 145 and 150 in such a way that AC voltages are present at the transmitting coils 110 and 115 which generally have different amplitudes and are subject to a small phase shift, generally in the range of below approximately 10°. However, the frequencies and pulse shapes used are the same; a rectangular or an at least approximated sinusoidal shape is used as the preferred pulse shape.

To determine a temperature influence on the sensor 100, a first measuring resistor (shunt) 165 is provided in series with the first transmitting coil 110, and a second measuring resistor 170 is provided in series with the second transmitting coil 115. The voltages dropping across the measuring resistors 165 and 170 indicate the currents flowing through the transmitting coils 110 and 115. The measuring resistors 165 and 170 preferably have a low temperature dependency and a low component tolerance.

Dedicated receiving amplifiers 135 or sampling devices may be assigned to the voltage of the receiving coil 120 and to the currents flowing through the transmitting coils 110 and 115. In the depicted preferred specific embodiment, instead, selection means 175 are provided which are controllable via the processing device 160, in order to connect only one of multiple, different signals to the input of the receiving amplifier 135. The selection means 175 preferably comprise switches or comparable switching elements, of which not more than one is closed at any time. Thus, alternatively, the voltage dropping across the first measuring resistor 165 or the voltage dropping across the second measuring resistor 170 or the measuring signal at the receiving coil 120 may be connected to the input of the receiving amplifier 135.

In the depicted preferred specific embodiment, an end of the receiving coil 120 which is not connected to the input amplifier 135 is connected to a first reference voltage source 180, and ends of the transmitting coils 110 and 115 which are not connected to the transmitting amplifiers 125 and 130 are connected to a second reference voltage source 185.

The reference voltage sources 180 and 185 each provide a predetermined DC voltage in order to be able to operate the coils 110, 115, and 120 at a predetermined operating point. In the depicted specific embodiment, the selection means 175 are also configured alternatively to connect the second reference voltage source 185 to the receiving amplifier 135. In one enhancement, the selection means 175 may also be configured to connect the first reference voltage source 180 to the receiving amplifier 135.

The processing device 160 is configured to apply first AC voltages to the transmitting coils 110 and 115 by means of the output amplifiers 125, 130 and then to determine the input signal of the receiving coil 120 and the currents flowing through the transmitting coils 110 and 115 by means of the selection means 175 and the input amplifier 135. The AC voltages present at the transmitting coils 110 and 115 preferably have predetermined amplitude ratios and a predetermined phase shift. This approach is subsequently repeated with second AC voltages which are different from the first AC voltages.

A first coupling factor K1 between the first transmitting coil 110 and the receiving coil 120, and a second coupling factor K2 between the second transmitting coil 115 and the receiving coil 120, are then determined based on the determined currents and voltages. At least coupling factors, preferably coupling factors and received signals of a preceding determination, are stored in a memory 190. The stored values may be due to the design of the sensor 100 and fixedly predefined. In another specific embodiment, the values are determined once, for example, in the described manner, while no object 105 is in the inductive area of influence of the coils 110 to 120; then, the defined values are stored in the memory 190.

If the received signals of the receiving coil 120 are different from the stored received signals, it may be possible to attribute this to an object 105 or a temperature influence on portions of the sensor 100. If the determined coupling factors K1 and K2 do not differ from the stored coupling factors, the sensor 100 is subject to a temperature influence. The determined temperature influence may be output via an interface 195. Otherwise, if the coupling factors K1, K2 are different with respect to the previous measurement, an object 105 is present in the area of the coils 110 to 120. The size, type, and position of the object 105 may then be determined more exactly based on the determined received signals and coupling factors with reference to the geometry of the transmitting coils 110 and 115 and the receiving coil 120. The result may then also be output via the interface 195.

For the measurements of the currents and voltages at the coils 110 to 120, the following equations apply:

$$U_{sec}(1) = K1 \cdot I1(1) + K2 \cdot I2(1) \quad \text{(Equation 1)}$$

$$U_{sec}(2) = K2 \cdot I1(2) + K2 \cdot I2(2) \quad \text{(Equation 2)}$$

where:

$U_{sec}(1)$ is the voltage of the receiving coil (120) (received signal) during the first AC voltage, $U_{sec}(2)$ is the voltage of the receiving coil (120) (received signal) during the second AC voltage, I1(1) is the current flowing through the first transmitting coil 110 during the first AC voltage, I2(1) is the current flowing through the second transmitting coil 110 during the first AC voltage, I1(2) is the current flowing through the first transmitting coil 110 during the second AC voltage, I2(2) is the current flowing through the second transmitting coil 110 during the second AC voltage, K1 is the coupling factor between the first transmitting coil (110) and the receiving coil (120), and K2 is the coupling factor between the second transmitting coil (110) and the receiving coil (120).

The equation system of equations 1 and 2 is solved according to the coupling factors K1 and K2, and the coupling factors K1 and K2 are determined based on the determined voltages and currents.

In one preferred specific embodiment, the AC voltages of the first transmitting coil 110 and the second transmitting coil 115 each have a phase difference $\Delta$ of less than approximately $\pm 5°$ during the first or second AC voltages. The amplitudes of the voltages at the transmitting coils 110 and 115 are preferably chosen as a function of the coupling factors K1 and K2. For this purpose, constants A and B are formed, and during the first AC voltage, the voltage of the first transmitting coil 110 is (A) and the voltage of the second transmitting coil 115 is (B+C1). During the second AC voltage, the voltage of the first transmitting coil 110 is (A+C2) and the voltage of the second transmitting coil 115 is (B). The summands C1 and C2 are preferably equal. C1 is preferably approximately 3% to 7% of A; C2 is preferably approximately 3% to 7% of B. The ratio A/B preferably corresponds to the ratio K2/K1, the reciprocal value of the coupling factors K1 and K2.

In an additional specific embodiment, the received signal, i.e., the voltage of the receiving coil 120, is determined under different polarities of the receiving coil 120, while the AC voltages at the transmitting coils 110 and 115 remain unchanged. The voltage of the first transmitting coil 110 is thus A and the voltage of the second transmitting coil 115 is B; a phase difference $\Delta$ between the voltages is in the range of approximately $\pm 5°$. A, B, and $\Delta$ are chosen in such a way that the received signal does not change when reversing the polarity of the receiving coil 110.

Figure 2A:
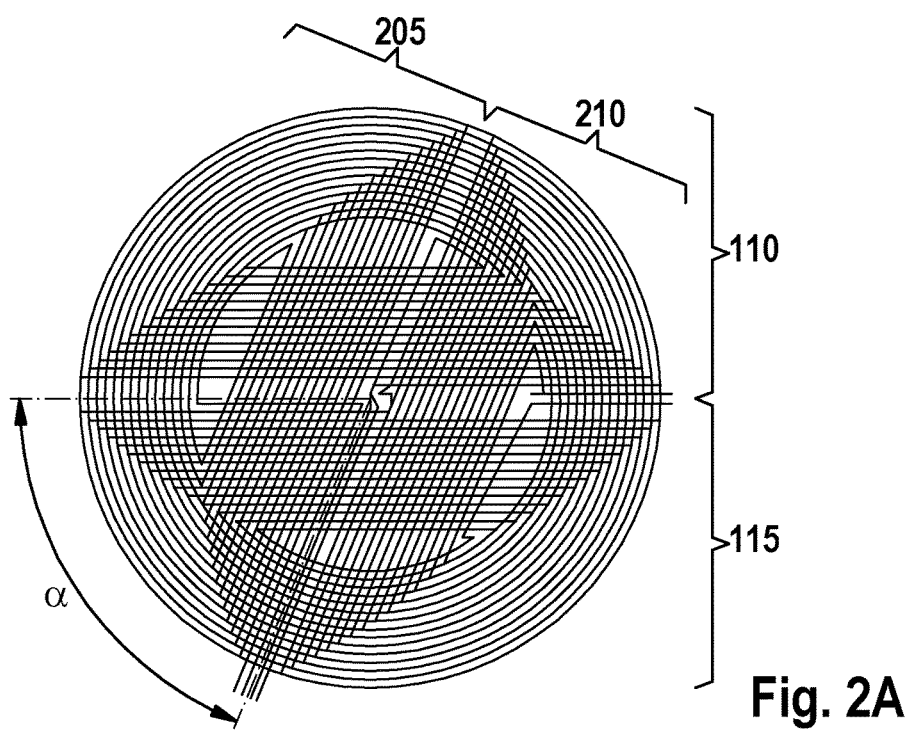
FIG. 2 shows two specific embodiments of coils of the sensor from FIG. 1.

FIG. 2 shows two specific embodiments of coils 110 to 120 of the sensor 100 from FIG. 1. The coils are distributed over two planes, which are offset in parallel with the observation plane. In the exemplary embodiment shown above from FIG. 2A, the first transmitting coil 110 is in a first plane and the second transmitting coil 115 is in a second plane. The receiving coil 120 comprises a first D-shaped portion 205 which is in the first plane and a second D-shaped portion 210 which is in the second plane. Directions along which the portions 205 and 210 or the transmitting coils 110 and 115 are adjacent to each other form an angle α between them, which is preferably not equal to 90°.

Figure 2B:
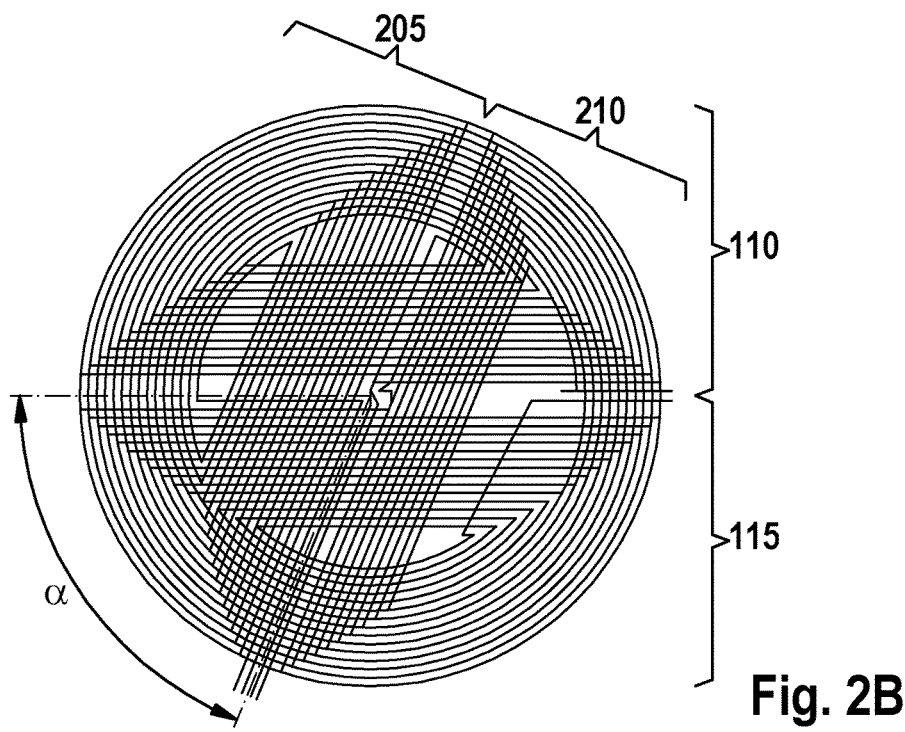

FIG. 2B shows one specific embodiment which resembles that of FIG. 2A, in which, however, the portions 205 and 210 of the receiving coil 120 have different numbers of turns. The specific embodiments of FIGS. 2A and 2B are preferably suitable for use on the sensor 100 from FIG. 1.

However, other specific embodiments or arrangements of the coils 110, 115, and 120 are possible, if the transmitting coils 110 and 115 are inductively coupled to the receiving coil 120 and there is an electromagnetic area of influence in which a generated electromagnetic field is able to be influenced by an object 105.

Figure 3:
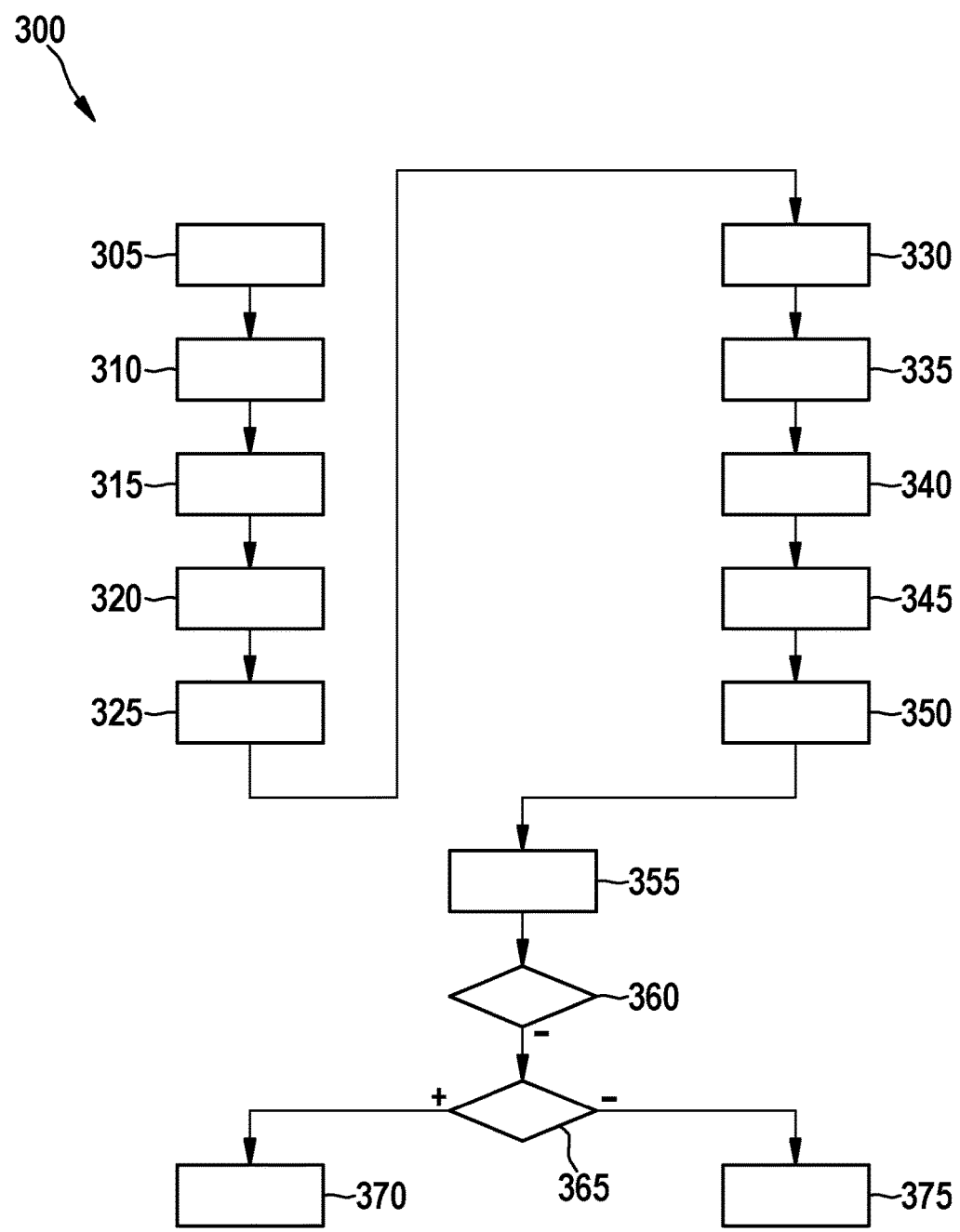
FIG. 3 shows a flow chart of a method for determining a temperature influence on the sensor from FIG. 1.

FIG. 3 shows a flow chart of a method for determining a temperature influence on a sensor for locating metallic or magnetic objects like that of FIG. 1. The method 300 is in particular configured for running on the processing device 160.

In a first step 305, a first AC voltage is applied to the first transmitting coil 110. In a step 310, a second AC voltage is applied to the second transmitting coil 115. Subsequently, in a step 315, the current I1(1) flowing through first transmitting coil 110 is determined; in a step 320, the current I2(1) flowing through the second transmitting coil 115 is determined; and in a step 325, the voltage at the receiving coil 120 is determined.

In a similar manner, in a step 330, a third AC voltage is applied to the first transmitting coil 110, and in a step 335, a fourth AC voltage is applied to the second transmitting coil 115. Afterwards, in a step 340, the current I1(2) flowing through the first transmitting coil 110 is determined; in a step 345, the current I2(2) flowing through the second transmitting coil 115 is determined; and in a step 350, the voltage of the receiving coil 120 is determined. In a variant of the method 300, the determination of the currents I1(1), I2(1), I1(2), and I2(2) may also be carried out less frequently than the determination of the voltage at the receiving coil 120.

Subsequently, in a step 355, coupling factors K1 and K2 are determined, as described above in greater detail with reference to equations 1 and 2. In an additional specific embodiment, the steps 305 to 355 may subsequently also be run through again, with the difference that the polarity of the receiving coil 120 is reversed. In this case, the voltages at the transmitting coils 110 and 115 preferably remain unchanged, so that the steps 315 and 320, in which the transmitting currents of the transmitting coils 110 and 115 are determined, preferably have to be run through only once. Reversing the polarity may be carried out by means of the selection means 175, or a dedicated polarity reversal device may be provided for the receiving coil 120, for example, a relay or a bridge circuit. In one specific embodiment, each end of the receiving coil 120 may alternatively be connected to the input amplifier 135 or the first reference voltage source 175 by means of the polarity reversal device. It may also be provided to isolate the receiving coil 120 on one or both sides from the rest of the circuit. Subsequently, the determined coupling factors K1 and K2 of both measurements are scaled and subtracted from each other in pairs:

$$K1' = K1(1) - K1(2) \quad \text{(Equation 3)}$$

$$K2' = K2(1) - K2(2) \quad \text{(Equation 4)}$$

where:

K1(1) is the first coupling factor K1 between the first transmitting coil 110 and the receiving coil 120 after the first iteration, K1(2) is the first coupling factor K1 between the first transmitting coil 110 and the receiving coil 120 after the second iteration, K2(1) is the second coupling factor K2 between the second transmitting coil 115 and the receiving coil 120 after the first iteration, K2(2) is the second coupling factor K2 between the second transmitting coil 115 and the receiving coil 120 after the second iteration.

Before subtracting, the coupling factors K1 and K2 may also be provided with scaling. Scaling and subtraction in pairs may possibly also be carried out separately for the real and imaginary parts of the coupling factors. The required scaling factors may be stored in the nonvolatile memory of the processing unit or calculated by the processing unit based on measurements.

In particular, if a voltage amplifier is used for measuring the voltage induced in the receiving coil 120, this voltage may be a function of the polarity with which the receiving coil 120 is connected to the receiving amplifier 135. This behavior always appears if the input impedance of the receiving amplifier 135 is different from the impedance of the second reference voltage source 185. By reversing the polarity of the receiving coil 120, determining the coupling factors K1 and K2 for both polarities, and subtracting the coupling factors K1 and K2 from each other in pairs, the dependency of the voltage induced in the receiving coil 120 on the polarity may be eliminated. Thus, it is also possible to eliminate unavoidable temperature influences on the induced voltage, which arise due to temperature-related changes in the impedances of the input amplifier 135 or the second reference voltage source 185.

When subtracting the coupling factors K1 and K2 determined under differing polarities, interference, the sign of which is a function of the polarity the polarity of the receiving coil 120, doubles in magnitude. This in particular relates to induction-related interference. On the other hand, interference, the sign of which sign which is invariant with respect to the polarity under which the coupling factors K1 and K2 were determined, is eliminated. This in particular includes capacitance-related interference. By subtracting, the coupling factors K1' and K2' are better able to indicate the object 105 instead of a temperature influence.

In a step 360, it is determined that the received signals of the receiving coil 120 are different from the stored values which, for example, may be obtained from the memory 190 in FIG. 1. Afterwards, in a step 365, it is determined whether the determined coupling factors K1 and K2 differ from the stored coupling factors. If this is the case, in a step 370, the presence of an object 105 in the area of the coils 110, 115, and 120 is inferred. Otherwise, in a step 375, a temperature influence on the sensor 100 is determined.

The method 300 may subsequently return to step 305 and be performed again. A temperature influence determined in a step 375 may be taken in consideration during a later determination of the object 105 in a step 375, so that the temperature influence on the sensor 100 is compensated for, and the signal provided at the interface 195 indicating the object 105 is adjusted for the temperature influence.

The invention claimed is:

1. A method for locating an object that is at least one of metallic and magnetic with a sensor including two transmitting coils and a receiving coil which are inductively coupled to each other, the method comprising:

supplying a first pair of predetermined AC voltages to the two transmitting coils;

sampling first currents flowing through the two transmitting coils and a first voltage of the receiving coil while the first pair of predetermined AC voltages are supplied;

supplying a second pair of predetermined AC voltages to the two transmitting coils;

sampling second currents flowing through the two transmitting coils and a second voltage of the receiving coil while the second pair of predetermined AC voltages are supplied;

determining, with a processor, coupling factors between the two transmitting coils and the receiving coil based on (i) the sampled first currents through the two transmitting coils, (ii) the sampled second currents through the two transmitting coils, (iii) the sampled first voltage of the receiving coil, and (iv) the sampled second voltage of the receiving coil; and detecting, with the processor, the object based on the coupling factors.

2. The method as claimed in claim 1, further comprising:
detecting, with the processor, the object if the coupling factors differ with respect to coupling factors of a previous measurement.

3. The method as claimed in claim 2, wherein previously sampled voltages of the receiving coil of the previous measurement and the coupling factors of the previous measurement relate to an arrangement in which the inductive coupling between the two transmitting coils and the receiving coil is not influenced by metallic or magnetizable objects.

4. The method as claimed in claim 1, further comprising:
phase-shifting the first pair of predetermined AC voltages with respect to each other by less than ±5°; and
phase-shafting the second pair of predetermined AC voltages with respect to each other by less than ±5°.

5. The method as claimed in claim 1, further comprising:
choosing constants A, B, C1, and C2 such that the following statements are valid:
a voltage of a first transmitting coil of the two transmitting coils for the first pair of predetermined AC voltages is equal to A;
a voltage of a second transmitting coil of the two transmitting coils for the first pair of predetermined AC voltages is equal to B plus C1;
a voltage of the first transmitting coil for the second pair of predetermined AC voltages is equal to A plus C2;
a voltage of the second transmitting coil for the second pair of predetermined AC voltages is equal to B;
A divided by B is equal to a second coupling factor of the coupling factors that corresponds to the second transmitting coil divided by a first coupling factor of the coupling factors that corresponds to the first transmitting coil;
C1 is approximately 3% to 7% of A; and
C2 is approximately 3% to 7% of B.

6. The method as claimed in claim 1, further comprising:
determining the coupling factors and offsetting the coupling factors against each other a first time; and
determining the coupling factors and offsetting the coupling factors against each other a second time after reversing a polarity of the receiving coil.

7. The method as claimed in claim 1, wherein a computer program product includes program code configured to carry out the method if the computer program product runs on a processing device or is stored on a computer-readable data carrier.

8. A sensor for locating an object that is at least one of metallic and magnetic, comprising:
two transmitting coils;
a receiving coil, the two transmitting coils and the receiving coil inductively coupled to each other;
a control device configured to supply the two transmitting coils with AC voltages;
a sampling device configured to sample currents flowing through the two transmitting coils and to sample a received signal from the receiving coil;
a processing device configured to determine coupling factors between the two transmitting coils and the receiving coil based on the sampled currents and the sampled received signal, the processing device further configured to detect the object based on the coupling factors.

9. The sensor as claimed in claim 8, wherein:
the sampling device comprises an analog-digital converter and a selection device configured to alternatively sample the received signal from the receiving coil or one of the currents flowing through the two transmitting coils.

10. The sensor as claimed in claim 8, further comprising:
a selection device configured to reverse a polarity of the receiving coil.

11. The sensor as claimed in claim 8, wherein the control device comprises a digital-analog converter.

12. The sensor as claimed in claim 8, further comprising:
a first reference voltage source configured to supply the receiving coil with a predetermined voltage.

13. The sensor as claimed in claim 12, further comprising:
a second reference voltage source configured to supply each of the transmitting coils with a predetermined voltage.

14. A measuring device for detecting objects enclosed in a medium, comprising:
at least one sensor including (i) two transmitting coils, (ii) a receiving coil, the two transmitting coils and the receiving coil inductively coupled to each other, (iii) a control device configured to supply the two transmitting coils with AC voltages, (iv) a sampling device configured to sample currents flowing through the two transmitting coils and to sample a received signal from the receiving coil, and (v) a processing device configured to determine coupling factors between the two transmitting coils and the receiving coil based on the sampled currents and the sampled received signal, the processing device further configured to detect the object based on the coupling factors.

* * * * *